G. W. EDDY.
Stop-Valves.

No. 141,041. Patented July 22, 1873.

Witnesses:

Inventor:
G. W. Eddy
Per
Attorneys.

UNITED STATES PATENT OFFICE.

GEORGE W. EDDY, OF WATERFORD, NEW YORK.

IMPROVEMENT IN STOP-VALVES.

Specification forming part of Letters Patent No. 141,041, dated July 22, 1873; application filed April 26, 1873.

*To all whom it may concern:*

Be it known that I, GEORGE W. EDDY, of Waterford, in the county of Saratoga and State of New York, have invented a new and Improved Stop-Valve, of which the following is a specification:

My invention relates to that class of stop-valves for water, steam, gas, &c., in which one or two disks or gates are arranged in a chamber traversing the water-way, and work transversely across the water-way on the seat or seats, and are pressed thereon to close the water-passage by means of the valve-stem; and it consists of levers combined with the disks or gates and an enlargement on the valve-stem in such manner that when, in closing, the gates have returned to their seats the levers and the enlargement come into play in such manner that they force the gates upon their seats with a powerful lever-pressure, which is produced with the stem by the operator without much effort.

Three objects are effected by the invention: First, the powerful leverage and easy action in closing the valve, also a corresponding easy action in opening it; second, an arrangement of the valve-stem so that, without having to slide in and out of the chamber in operating the valve, it is made available for pressing the gates on the seats, to hold them tight when shut, and yet does not extend into the water-way when the valve is open, and thus avoids obstructing the water and collecting objects in the water which would lodge against it; and third, an arrangement by which the construction is so simplified that the gates and devices connecting them with the stem can be made by casting so as to go together with but little finishing.

Figure 1:
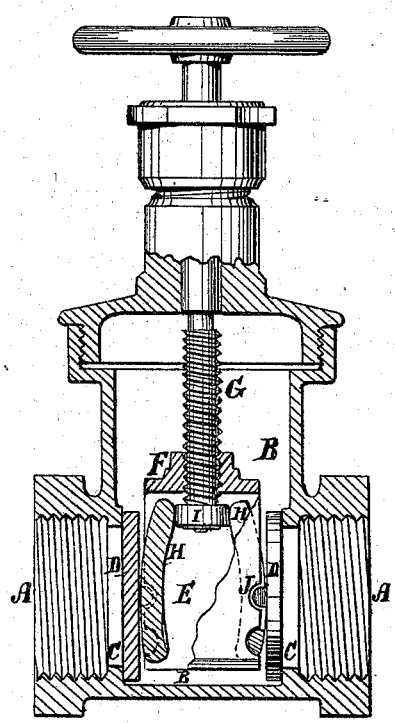
Figure 2:
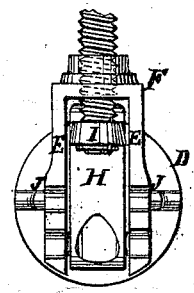
Figure 3:
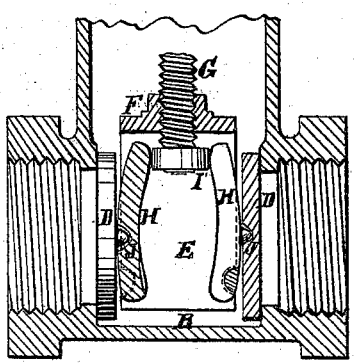

Figure 1 is a sectional elevation of my improved stop-valve. Fig. 2 is a side elevation of part of the valve-stem, one of the gates or disks, a lever, the enlargement on the valve-stem, and the device by which the gates and levers are suspended from the stem; and Fig. 3 is a partial section like Fig. 1, showing a modified arrangement of the connection of the gates with the stem.

Similar letters of reference indicate corresponding parts.

A is the water-way; B, the valve-chamber crossing it; C, the valve-seats; D, the disks or valves; E, plates; and F, a nut or cross-head by which the gates are suspended from the valve-stem G; H, the levers; and I, the enlargement on the stem for pressing the valves against the seats. It will be observed that the valve-stem terminates in the chamber at or about the upper side of the water-way, so that it is allowed to be arranged so as not to have endwise motion, and yet does not obstruct the water-way. In consequence of thus terminating at the side of the water-way the plates E are applied to the cross-head for connecting the gates at their centers and carrying them beyond the end of the screw to their seats. The gates are connected to them at J in this example by notches in the edges of the plates and projections on the gates, but the notches may be in the gates and the projections on the plates. With these gates I employ the levers and the enlargement I to press them powerfully on the seats in the manner shown, the levers being so adjusted that the free ends, which are curved or inclined inward for the purpose, will be forced outward by the enlargement during the latter part of the closing operation. In this example the levers are connected to the plates E below the connection of the gates with said plates, but they may be connected at the same points, if preferred. The gates may be connected to the levers as represented in Fig. 3, if preferred. The enlargement on the stem may turn with it or be loose and not turn, as preferred.

It will be seen that the plates E can be cast together with the nut or cross-head, also with their notches or projections for the connection of the gates and levers; also, the gates can be cast so as to connect with the plates or levers, so as to require but little finishing for connecting them, thus simplifying and cheapening the construction.

This arrangement is alike applicable whether one gate and lever or two are used, or one gate and two levers, which may sometimes be preferred, one gate being dispensed with and the lever on that side or the plates E, in case no lever is used, acting against a bar or plate traversing the water-way, or the plates E may rest against the side walls of the chamber, each side of the water-way as a purchase or fulcrum for the other lever; and I do not, therefore, limit myself to two gates and levers.

With this arrangement it is immaterial whether the valve-seats are parallel to each other or convergent.

It is obvious that my invention does away with the necessity of using any bolts, rivets, or pins for fastening the gates to the working-parts.

Having thus described my invention, I claim as new and desire to secure by Letters Patent—

The combination of gates D and levers H, each having the lugs described, the device E F having edge and adjusting notches, and the valve-stem provided with enlargement I, substantially as and for the purpose specified.

GEO. W. EDDY.

Witnesses:
T. B. MOSHER,
ALEX. F. ROBERTS.